US004001599B2

United States Statutory Invention Registration [19]

[11] Reg. Number: H1599

[45] Published: Oct. 1, 1996

Task et al.

[54] SYNTHETIC-COLOR NIGHT VISION

[75] Inventors: Harry L. Task, Dayton; Alan R. Pinkus, Fairborn, both of Ohio

[73] Assignee: The United States of America as represented by the Secretary of the Air Force, Washington, D.C.

[21] Appl. No.: 498,449

[22] Filed: Jul. 5, 1995

[51] Int. Cl.[6] ..... H04N 9/04

[52] U.S. Cl. ..... 348/33; 348/32; 348/34; 348/42

[58] Field of Search ..... 348/32, 33, 34, 348/42

[56] References Cited

U.S. PATENT DOCUMENTS

| | | | |
|---|---|---|---|
| 4,965,448 | 10/1990 | Morse et al. | 250/252.1 |
| 5,051,821 | 9/1991 | Vittot et al. | 348/33 |
| 5,070,239 | 12/1991 | Pinkus | 250/252.1 |
| 5,182,639 | 1/1993 | Jutamulia | 348/33 |
| 5,200,622 | 4/1993 | Rouchon et al. | 250/334 |
| 5,214,503 | 5/1993 | Chiu et al. | 348/33 |
| 5,323,002 | 6/1994 | Sampsell et al. | 250/252.1 |
| 5,440,352 | 8/1995 | Deter et al. | 348/33 |

*Primary Examiner*—Bernarr E. Gregory
*Attorney, Agent, or Firm*—Gerald B. Hollins; Thomas L. Kundert

[57] ABSTRACT

A synthetic color arrangement for a night vision inclusive surveillance system and its display is disclosed. The system partitions an input scene video signal into spectrally segregated scene components which are provided with separate processing as video signals and then recombined into a composite but now multiple color inclusive output representation of the input scene. The system in effect shifts input spectral components to a different part of the electromagnetic spectrum, the visible range of the spectrum, where operator controllable new spectral wavelength values are assigned to each different input scene spectral wavelength. Use of charge coupled device video camera elements, a video signal mixer apparatus, input wavelengths within both the visible and infrared spectral regions and signal processing according to the NTSC standards are also included. Military and non military uses of the apparatus are contemplated.

18 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYNTHETIC-COLOR NIGHT VISION

RIGHTS OF THE GOVERNMENT

The invention described herein may be manufactured and used by or for the Government of the United States for all governmental purposes without the payment of any royalty.

BACKGROUND OF THE INVENTION

This invention concerns the field of color enhanced video displays related to night vision devices.

It appears to be well recognized in the art of human communication that color enhances the human ability to perceive patterns, remember shapes, and distinguish between otherwise similar shapes for examples. Perhaps one of the most outstanding present day examples of this human characteristic is to be found in the almost universal replacement of monochromatic image display equipment with the color enhanced counterpart equipment in the fields of television reception and computer terminal devices. Indeed the consumer preferences which dictate manufacturer's actions in these fields have limited the use of monochromatic equipment to special situations such as small sized displays, low energy displays and other instances wherein response to a specific need is considered to outweigh the benefits of a color image. These preferences also extend to the field of military equipment displays, most notably for present purposes, to the field of surveillance equipment and especially to equipment involving fight vision capability, i.e., equipment involving night vision as a stand alone capability or night vision in combination with day vision or with radar or laser sourced information.

In the field of night vision for example current state-of-the-art equipment provides intensified, monochromatic, shades-of-green imagery as an output to a user or observer. In general however, it is found that color encoding can significantly increase observer performance with visual tasks in this field just as color encoding is found to improve human performance and acceptance in the computer display and television fields. For present use purposes therefore it is considered to be a guiding principle that given an optimized night vision system configuration, the visibility of certain man-made, natural, and camouflaged objects, when color encoded, are rendered more visible to most users; such color encoding thereby results in quicker object detection and/or recognition by a user or observer.

In addition to such color capable equipment being useful as a research tool, night vision equipment of this color capability can also be packaged for use as a vehicle-mounted night-sensor system for military and non military field use, for use in automotive equipment or aircraft for example. Moreover color capable equipment which utilizes a broad spectrum of input wavelengths, wavelengths which include both the visible and infrared (IR) spectral regions, can further increase system and user-system performance. In this equipment, size and weight are not as critical as in the case of head-mounted vision systems since color-capable equipment is viewed as having primary utility in large area environments.

The U.S. Patent art indicates the presence of inventive activity in the field of night vision devices and their testing. One such patent is U.S. Pat. No. 5,200,622 issued to J. M. Rouchon et al., a patent which is concerned with an infrared observation system having a serf checking feature. The Rouchon patent uses a Narcissus effect parasitic image which is imposed on the useful image of an aircraft pod mounted or other infrared system to achieve the self checking feature. The Rouchon patent appears however to be only distally related to the presentation of artificially colored images in a system having infrared input capability as in the present invention.

The invention of R. D. Rosenthal in U.S. Pat. No. 5,204,532 is of general background interest with respect to the present invention in the sense that it discloses use of near infrared spectral calibration standards, i.e., spectral clusters of known calibration constant, to achieve accurate calibration of a blood glucose measuring system. The Rosenthal apparatus appears however to be only distally related to the presentation of artificially colored images in a system having infrared input capability as in the present invention.

Similarly the patent of J. R. Apperson et al., U.S. Pat. No. 5,206,511, is of general background interest with respect to the present invention. The Apperson patent discloses an arrangement for calibrating an infrared apparatus of the blood gas analyzer type, a device of the nature used in surgical operating rooms to measure a patient's breath gasses. This calibration is achieved with known standard elements which have predetermined numeric values of radiation, reflection, or absorption. The Apperson apparatus appears however to be only distally related to the presentation of artificially colored images in a system having infrared input capability as in the present invention.

The invention of P. G. Morse in U.S. Pat. No. 4,965,448 is also of general background interest with respect to the present invention in the sense that it discloses use of a calibration standard in an infrared detector system. The Morse apparatus also appears however to be only distally related to the presentation of artificially colored images in a system having infrared input capability as in the present invention.

The invention of J. B. Sampsell et al. in U.S. Pat. No. 5,323,002 is also of general background interest with respect to the present invention in the sense that it discloses use of a calibration arrangement in an optical system. In particular, the Sampsell et al. system uses a spatial light modulator to achieve a desired mix of different temperature or different color-operated calibration sources. The Sampsell et al. apparatus appears however to also be only distally related to the presentation of artificially colored images in a system having infrared input capability as in the present invention.

The prior patent of an inventor named in the present patent document, U.S. Pat. No. 5,070,239, issued to A. R. Pinkus, is also of background interest with respect to the present invention. This patent discloses a NIGHT VISION GOGGLE (NVG) testing arrangement which includes an input signal source and a NVG output measuring apparatus for evaluating the tested NVG's response to this input signal. The Pinkus apparatus appears however to be only distally related to the presentation of artificially colored images in a system having infrared input capability as in the present invention.

SUMMARY OF THE INVENTION

The present invention achieves artificial coloring in the normally monochromatic output display of night vision devices. Object coloration according to the spectrum or wavelength location of the night vision device input data relating to that object is achieved in order to for example enhance speed and accuracy of operator perception of the displayed image.

It is an object of the present invention therefore, to provide an accurate and convenient night vision device data communication arrangement.

It is another object of the invention to provide shifting of a night vision device output image into a broad range of the visible spectrum.

It is another object of the invention to provide a night vision device output display which is color coded according to some predetermined convention.

It is another object of the invention to provide a night vision device output display that is color coded in a manner easily understood by a human user.

It is another object of the invention to provide a color inclusive night vision device output display which can be accomplished in laboratory settings with the use of readily available equipment.

It is another object of the invention to provide a night vision device which uses a selectable number of input image wavelength bands in fabricating a composite color output image.

It is another object of the invention to provide a night vision device color display which can be fabricated in a relatively small physical size.

It is another object of the invention to provide a night vision device which shifts an input image into a selected portion of the visible spectrum, a portion such as Commission Internationale de l'Eclairage (CIE) color space.

Additional objects and features of the invention will be understood from the following description and claims and the accompanying drawings.

These and other objects of the invention are achieved by the method of communicating a composite image, representative of an input scene which includes objects generating signatures of differing visible to near infrared spectral wavelengths, to a user person comprising the steps of:

dividing said input image into a plurality of component images each containing input scene partial portions received from a selected different signature spectrum wavelength range of said input image;

displaying each of said component images to said user person as an in-registration different color component of a visible spectrum wavelength resident, composite common output image.

DETAILED DESCRIPTION

Figure 1:
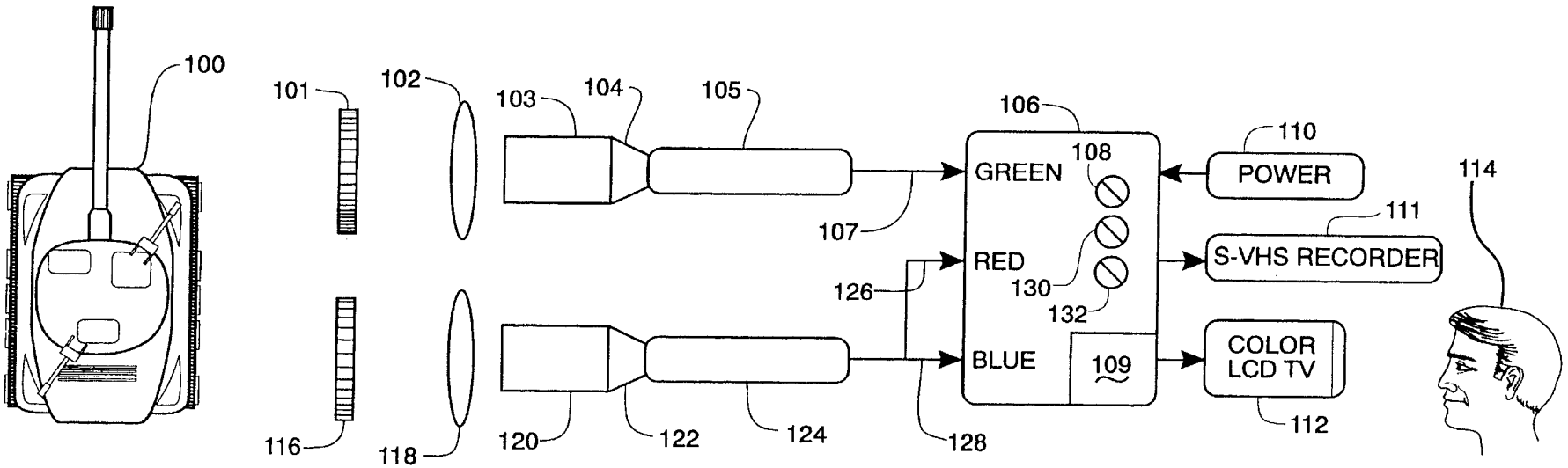
FIG. 1 shows a functional block diagram of apparatus which may be used to embody the present invention.
Figure 2:
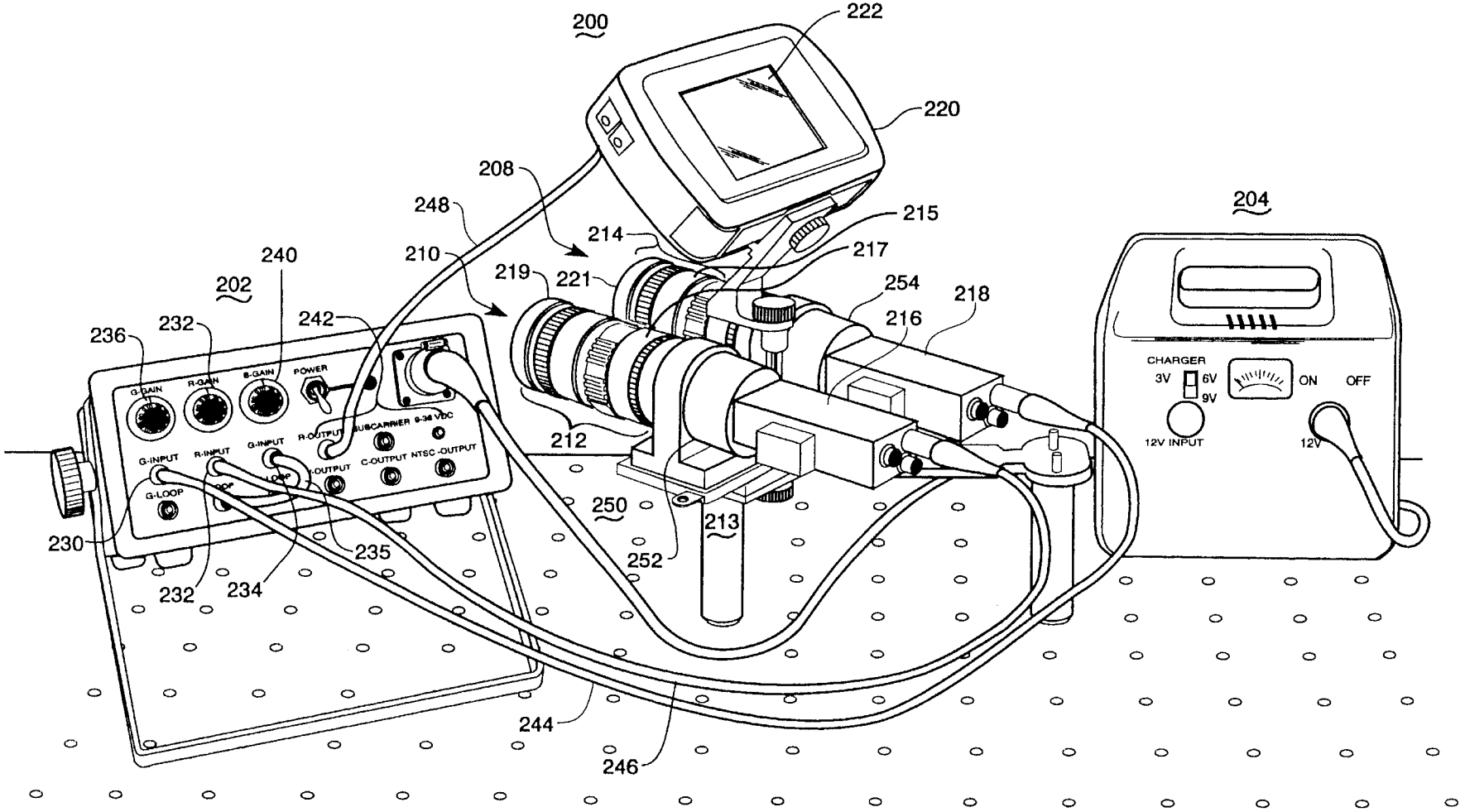
FIG. 2 shows an overall perspective physical view of apparatus which may be used to embody the present invention.

FIG. 2 in the drawings shows an overall perspective and physical view of apparatus which may be used to embody the invention. More precisely, FIG. 2 shows three major components of the preferred embodiment of the invention, a night vision assembly at 200, a video mixer apparatus at 202 and a power supply or energy source, 204, for the other FIG. 2 elements. In the FIG. 2 drawing there is specifically shown a pair of individual night vision devices 208 and 210 which are coupled as input signal sources to the video mixer apparatus 202. These night vision devices 208 and 210 each include optical assemblies, 212 and 214, and transducer assemblies 216 and 218 which receive radiant energy input signals from the optical assemblies 212 and 214 and generate electrical output signals which are communicated to the video mixer apparatus 202. The optical assemblies 212 and 214 each include zoom lense arrays 215 and 217 and a pair of optical wavelength filters 219 and 221 which divide the radiant energy received from an input scene into two component images of differing wave-length range. These wavelength ranges may be mutually exclusive as to wavelength or alternately may be of a somewhat overlapping nature as is explained in greater detail in connection with the FIG. 1 drawing below.

In the night vision assembly 200 the night vision devices 208 and 210 include image intensifier tube portions indicated at 252 and 254 in FIG. 2 and low light level television camera tube elements comprising major portions of the transducer assemblies 216 and 218. The night vision assembly 200 also includes a night vision device display assembly 220 which incorporates a viewing screen 222. According to the present invention, the viewing screen 222 is of the color image displaying type and is capable of communicating images in at least three colors. The viewing screen 222 may be for example of the three color, red green and blue image component type as is commonly used in the NTSC (National Television Standards Committee) and other color television systems. As shown in FIG. 2 the night vision device display assembly 220 is of the small physical size that is characteristic of liquid crystal-based displays; cathode ray tube and other types of displays are of course usable in other arrangement of the invention. Both the night vision assembly 200 and the video mixer apparatus 202 in the FIG. 2 drawing may be energized from the power supply or energy source 204; alternately one or both of these components may be of the serf contained or battery energized type. The video mixer apparatus 202 in FIG. 2 is used to receive component or partial images of an input scene from each of night vision device 208 and night vision device 210 and to combine these component images into a composite or final color image. The video mixer apparatus 202 as shown in FIG. 2 is of the three color component or three channel type of video mixer, e.g., of the type used in the NTSC color system. As is shown in the FIG. 1 diagram the video mixer apparatus 202 may be arranged to have two of the available three channels connected to the same source of video input data, i.e., to the output of a single night vision device 208 or night vision device 210 in the disclosed arrangement of the invention. Coaxial cable or other conductors for communicating the component image video data from the night vision device 208 or night vision device 210 to the video mixer apparatus 202 are indicated at 244 and 246 in the FIG. 2 drawing. These conductors connect to two of the three input ports 230, 232, and 234 of the video mixer apparatus 202; the jumper cable 235 connects the input of one port to the input of another port in order to achieve the described arrangement of one video signal feeding two mixer input ports. The functions performed within the video mixer apparatus 202, especially a mixer operating in accordance with the NTSC protocol are believed to be well known in the electrical and electronic art and to therefore require no additional explanation.

Individual channel gain controls for the three channels of the video mixer apparatus 202 in FIG. 2 appear at 236, 238 and 240 in the FIG. 2 drawing. These controls enable the selection of differing intensities of the respective primary colors, such as the red, green and blue colors of the NTSC system, in the output display of the system. This selectivity allows user adjustment of the system output colors. An array of output ports for the signals generated in the video mixer apparatus 202 is indicated at 242 in FIG. 2; these signals may include a subcarrier signal, a NTSC coded signal and a composite image video signal for example. As shown in FIG. 2 the conductor 248 is used to communicate a composite image video signal from the video mixer apparatus 202 to the night vision device display assembly 220.

Video mixer equipment is manufactured by a number of suppliers to the electronic marketplace in addition to the supplier indicated below herein. In a space and weight considered and product engineered arrangement of the invention the video mixer apparatus 202 can of course be replaced by dedicated hardware or dedicated software in order to realize the invention in an optimum manner. Such dedicated hardware or software can be arranged to emulate the functions of the video mixer apparatus 202 without undue experimentation by persons skilled in the electronic art. As is suggested by both the separately housed video mixer apparatus 202 and by the brassboard appearance of the support board element 250 in the FIG. 2 drawing, the illustrated arrangement of the invention is of a laboratory or non product engineered configuration which is embodied with the use of off-the-shelf components. Clearly for vehicular or in-the-field or combat area use of the invention, the components shown in FIG. 2 or their specifically tailored equivalents can be contained within a single housing, reduced in volume and possibly weight, ruggedized, and otherwise made more suitable for non laboratory deployment.

The FIG. 2 apparatus and the following FIG. 1 described details of this apparatus can perhaps be better appreciated by considering briefly the current state of the night vision device art and possible areas of improvement to this art. In a conventional microchannel-based night vision goggle device, near-infrared (IR) photons (of 650 to 1000 nanometers wavelength) are converted to electrons, amplified, and then using a phosphor screen, converted into visible green imagery that is viewed by an observer, thereby allowing night vision. Generation 3 night vision goggles (NVGs) therefore present such a monochromatic, shades-of-green image to the user.

Investigation and experience have shown that an increase in the level of user visual performance may be realized with the introduction of color coding to this environment Since NVGs amplify near-infrared energy of this 650 to 1000 nanometers wavelength and human color vision is sensitive to energy in the 400 to 770 nanometers of wavelength range, the addition of color to the output display of a night vision device, when accomplished according to the herein disclosed algorithm may be considered to be a mapping of objects from one region of the spectrum to another region and to thereby result in a synthetic-color scene rendition. In both subjective and objective terms, the present introduction of synthetic-color imagery to the night vision device art is believed to provide significant increases in user visual performance.

Conventional night vision devices (e.g., night vision goggles) therefore provide an observer with intensified, monochromatic, shades-of-green images. The present invention provides an alternative and more informative output display for an image-intensified system by adding color, according to specific relationships with wavelengths included in the input image, to the observer's input from the system. The present invention combines a spectral filter, lens, and for example a microchannel plate type image intensifier tube that is optically coupled (via a tapered fiber optic bundle) to a charge coupled device television camera, to form each of two information channels. By wavelength filtering or alternately by employing different types of image intensifier tubes with differing spectral responses (for example responses extended into the blue spectral region), each of these information channels amplifies different spectral regions of the real-world input image. According to the present invention these different amplified signals are electronically manipulated and combined using a video mixer, the output of which is displayed on a color monitor to the user.

The system of the invention therefore essentially parses the spectrum, then assigns primary colors which are combined to produce a multi-colored output image. This output image is called a synthetic-color image because it maps energy from the invisible to the visible radiant energy or light, however the system of the invention arbitrarily assigns (or maps) a visible color, for example, green, to input image objects which reflect or originate radiant energy of this wavelength. Generally speaking, this introduction of color-encoding increases the speed and accuracy of object detection and recognition, when compared to monochromatic systems.

In an optimized configuration of the invention system, certain objects will be rendered more visible when they are color encoded in this manner and thereby these objects are made susceptible of quicker detection and/or recognition by an observer. The system of the invention is also preferably arranged to utilize a broad spectrum input which includes both the visible and infrared spectral regions in order to increase system performance. The system of the invention can be packaged for use as a vehicle-mounted sensor system, an arrangement which may be desired since the involved apparatus may too heavy for mounting on the observer's head. In contrast with head-mounted devices such as night vision goggles, the output images from the present invention can be displayed by either a head-down or a visually-coupled display type system.

Turning now to the FIG. 1 drawing, there is provided in this drawing a number of additional details of the present invention and the apparatus shown in the FIG. 2 drawing. In the FIG. 1 drawing the legend numbers are taken from the 100 series of numbers and new numbers in this series are assigned to some objects represented in the FIG. 2 drawing; this is accomplished since FIG. 1 presents these objects in different and more functional form. In the FIG. 1 drawing the visible and near-infrared energy from a night scene, a scene which includes for example the armored tank 100, is first partitioned into two spectral component regions-regions such as the wavelength range of 400 to 700 nanometers for component 1 and 700 to 1000 nanometers for component 2. This partitioning is accomplished by the two optical bandpass wavelength filters 101 and 116 which may be disposed within or adjacent the night vision device 208 and night vision device 210 of FIG. 2. The armored tank 100 is a frequent target for an airborne night vision device and is therefore a realistic representation in the FIG. 1 drawing.

Orthogonality or mutual exclusivity of wavelength ranges is desirable between the optical bandpass filter 101 and optical bandpass filter 116 in FIG. 1 but is not a requirement for operation of the system. Preferably this mutual exclusivity is such that the two band-passes also do not omit any significant range of wavelengths within the selected overall range of the system since such a miss could exclude an object having only a signature of that wave-length from the output image of the system.. The desired concept in the filtering of input scene radiant energy is therefore to develop two different component images of the input scene with these components largely comprising different spectral wavelengths. These components may optionally include some components of common wavelength range especially as such common wavelength components are needed to avoid omission or serious attenuation of some intermediate wavelengths.

Relatively large or fast camera lenses as represented at 102 and 118, preferably lenses of f/1.4 size or larger, focus input scene energy onto the input port face of extended-blue image intensifier tubes 103 and 120 in FIG. 1. The output of these tubes is optically coupled by tapered fiber-optic bundle conduits 104 and 122 to the low light level charged-coupled device television cameras 105 and 124. The filter (optical bandpass filter 101 and 116), lenses 102 and 118, image intensifier tubes 103 and 120, and low light level television cameras 105 and 124 are all preferably held in a metal fixture which allows adjustment of height, separation, rotation, and toe-in/toe-out of the two subassemblies so that disparate images, caused by parallax for example, can be made to coincide. The general nature of one arrangement of this fixture can be discerned at 213 in the FIG. 2 drawing.

While this FIG. 2 disclosed arrangement of the invention using two separate cameras and manual adjustment for parallax can be used in laboratory or other embodiments of the invention, it may be more convenient to substitute for this FIG. 2 arrangement the use of an actual television camera apparatus, provided of course that such a camera is disposed to have the needed infrared wavelength spectral response. Such cameras often employ beam splitter elements and are provided with the needed careful optical alignment of these and the other optical elements during an initial setup procedure. Once aligned such cameras do not then require the parallax correction indicated above for a discrete camera arrangement of the invention. Such a television camera embodiment of the invention, when provided with three different optical bandpass filters, corresponding to the filters 101 and 116 herein, as part of their internal optical system, will of course supply three optical image component signals relating to the input image rather than the two component signals disclosed herein.

The outputs of the two cameras 105 and 124 in the FIG. 1 embodiment of the invention are fed to the green, red, and blue inputs 107, 126 and 128 of the video mixer 106. The mixer is equipped with three looping video inputs via appropriate connectors. One of these looping inputs is shown in use by way of the cable 235 in order to join the red and blue signal channels in the FIG. 2 drawing. In the video mixer 106 camera inputs are processed through parallel video amplifiers and routed to the inputs of a video broadcasting industry standardized NTSC encoder circuit. Each video amplifier's gain is controlled by a 10-turn potentiometer, the potentiometers indicated at 108, 130 and 132 in FIG. 2. A video sync generator within the video mixer 106, as indicated at 109 in FIG. 1, is controlled by an internal crystal oscillator. The NTSC encoder is tied internally to the video sync generator.

The video sync generator produces composite sync and continuous color subcarrier signals, signals that are brought out via BNC connectors to gen-lock camera one and camera two, i.e., the FIG. 1 television camera 105 and television camera 124, the cameras which correspond to the FIG. 2 night vision device 208 and night vision device 210. The video mixer 106 may be self-contained and operate on a 12V DC power source 110 to enable use in automobile, airplane, and possibly backpack situations.

The function of the video mixer may be viewed as moving the synthetic-color mapping of the invention within CIE color space by combining different amounts of the red green and blue primary colors. These signals can be combined by addition or by subtraction with the use of different primary colors as are known in the optical art.

The FIG. 1 apparatus also provides for a permanent recording of the synthetic-color rendition of an input scene via for example a super-VHS tape recorder 111. Such recording provides for subsequent laboratory evaluations of system performance in response to varying input conditions. The user or evaluator can monitor the data collection using a small, portable, color LCD television receiver as is represented at 112 in FIG. 1 and also by night vision device display assembly 220 in FIG. 2. Laboratory and field imagery can also be displayed on a larger, standard sized TV display when for example a group of observers participate in an evaluation. The system as described is capable of providing output images containing at least blue, green, yellow, orange, red, brown and black color components.

The components of the FIG. 1 and FIG. 2 embodiment of the invention are all of a standard and readily available in the art nature. In the interest of the most complete disclosure of the invention possible however the following list of identities and commercial sources for the FIG. 1 and FIG. 2 components is included herein.

Optical bandpass filters 101, 116: Corion LS-650,RS 812, Corion USA, Holliston, Ma.

Camera lens 102: Sony 16–64 millimeter zoom, Sony Corporation, Japan.

Extended blue image intensifier tube 103: ITT Corporation, Roanoak, Va.

Fiber optic bundle conduit 104: Electro-Optical Services Inc.,Charlottesville, Va.

Television camera 105: Sony XC-77, Sony Corporation, Japan.

S-VHS tape recorder 111: Panasonic S-VHS, AG-7400, Panasonic Corporation, Japan.

Television monitor 112,220: Sharp model 4m-T30u, Sharp Corporation, USA.

Optical bandpass filter 116: LL-650-R-V400, Corion USA, Holliston, Ma.

Video mixer apparatus 202: OEI 225, OEI Incorporated, Tuscon Az.

Power supply or energy source 204: Portable power station, Smart Charge Inc.

As shown in the FIG. 1 and FIG. 2 drawings, the system of present invention uses the output of the two cameras 105 and 124 or night vision device 208 and night vision device 210 to supply data to the three input ports of the video mixer 106 202. A parallel connection of the red and blue inputs of the video mixer 106 202, as represented at 126 and 235 in FIG. 1 and FIG. 2 respectively, is used to accomplish this two to three port input change in the preferred embodiment of the invention. Clearly this is not the only possible configuration of the invention since for example other parallel connections such as green and red are possible in the FIG. 1 arrangement of the invention. In addition, with the use of three different input spectrum filters in lieu of the two shown at 101 and 116, three different cameras each feeding its own input of the video mixer 106 can also be employed. Such embodiment of the invention involves the added complexity of optically aligning an additional camera and its input spectrum filter with two other such camera and filter combinations but is capable of providing added and possibly desirable resolution of the input spectrum.

In a similar manner, systems according to the present invention may be arranged to use a color display that is limited to two primary colors along with a two input video mixer. Systems according to the invention may also be assembled to employ different color pairings in a three primary color display. As suggested above synthetic colors may also be accomplished with use of either additive or subtractive primary color arrangements. In fact, it is within the spirit of the invention to employ any partition of an input scene into spectral band components and to feed any combination of primary colors with signals representing these spectral band components. It is also considered within the spirit of the invention to vary the proportions of primary colors in such combinations.

The invention may also be arranged to employ several different mapping configurations, each one optimized for a different type of mission. For example an aircraft mission may comprise an ingress to the target phase; a ground target acquisition and destruction phase and an egress from the target phase. For such a mission the instant invention could be used to provide one mapping scheme, which optimizes the presentation of terrain features, for use in the ingress and egress mission phases and another mapping scheme, which emphasizes the target and its environment features, for use in the acquisition and destruction phases. In such an arrangement of the invention electronic switching and proportion control of primary color mixing can be employed.

Use of the present invention equipment or any night vision equipment in the cockpit of an aircraft imposes limitation as to the type of illumination which may be used in that cockpit—if interference between cockpit lighting and the night vision device is to be avoided. For this reason, modem day military combat aircraft cockpit illumination and instrument illumination avoids the use of incandescent, fluorescent and other wide spectrum light sources and favors the use of night vision device-compatible, limited spectrum, illumination sources. The cockpit lighting in such aircraft is usually therefore restricted to the visible region below 650 nanometers of wavelength while the spectral sensitivity of night vision goggles is usually limited to the near-IR region above 650 nanometers of wavelength. Additional details regarding the desired relationship between night vision device and cockpit lighting spectral ranges is provided in our copending and commonly assigned patent document "NIGHT VISION DEVICE AUTOMATED SPECTRAL RESPONSE DETERMINATION", Ser. No. 08/498,499, which is hereby incorporated by reference herein. FIG. 4 of this document shows a graphical representation of a compatible relationship between night vision device spectral response and cockpit lighting spectral output.

Where the system of the present invention has no lighting compatibility requirements of this nature (for example, where it employs externally located sensors with respect to the cockpit or other IR-emitting light sources) then a much larger spectral range which includes both visible and near-IR energy can be partitioned before mapping to the primary colors. This arrangement appears to allow for a higher performance synthetic color system than one having a more restricted spectral range. Such a synthetic color system is desirable for use with externally-mounted scene sensors or cameras, cameras mounted in the nose of an aircraft for example. Camera weight and size are also less restrictive in this mounting arrangement.

When used as an experimental or laboratory apparatus the present invention allows the evaluation of different mapping schema as to their effectiveness in enhancing an observer's visual performance in ground site detection and recognition studies for example. This evaluation can of course also be made relative to the standard green night vision device imagery. If significant improvements are realized by the introduction of the present intensified, color-encoded imagery as now appears likely, the development of color-encoded head-mounted systems, similar in size, spectral range and use, to today's night vision goggles and other improvements to the fundamental concept of the invention can be justified.

The optical components shown in FIG. 1 and FIG. 2 may be physically mounted on an optical bench, or any other reasonably stable mechanical platform. In a product-engineered embodiment of the invention these components may of course be disposed on or within some specially designed rigid structure. An operational equipment or product engineered embodiment of the invention can be made to be relatively compact, lightweight, and serf-contained in nature so it can be used in the field as ground or airborne equipment. When used as an operational military apparatus or as a law enforcement apparatus for examples, the present invention can employ either a head-down or a visually coupled to the user's eyes type of display system. While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Night vision display apparatus for communicating visible to infrared spectrum-resident viewed scene input data to a user person as color-contrasted output images, said apparatus comprising the combination of:

means for dividing an image representing said viewed scene input data into a plurality of component images each comprising input scene partial images of a selected different spectrum range location;

means for displaying said component images as an in-registration different color component of a spectrum wavelength-shifted, visible spectrum wavelength-resident, composite common output image.

2. The night vision display apparatus of claim 1 wherein said component images comprise mutually exclusive wavelength range portions of said visible to near infrared spectrum-resident viewed scene input data.

3. The night vision display apparatus of claim 2 wherein said component images are two in number.

4. The night vision display apparatus of claim 1 wherein said means for dividing said input image into a plurality of component images comprises wavelength segregated inherent response characteristics in optical elements of said apparatus.

5. The night vision display apparatus of claim 1 wherein said means for dividing said input image into a plurality of component images comprises:

a plurality of radiant energy bandpass filter elements; and a plurality of radiant energy signal to video electrical signal transducer members each having a radiant energy input port connected with a radiant energy output of one of said bandpass filter elements.

6. The night vision display apparatus of claim 5 wherein said means for dividing said input image into a plurality of component images further comprises image intensifier means disposed intermediate each of said radiant energy bandpass filter elements and an associated radiant energy signal to video electrical signal transducer member.

7. The night vision display apparatus of claim 6 wherein:

said image intensifier means comprises an extended-blue image intensifier tube member;

said radiant energy signal to video electrical signal transducer members each comprise a charge coupled device low light level television camera member; and wherein said apparatus further includes:

tapered fiber-optic bundle means disposed intermediate said extended-blue image intensifier tube member and each said charge coupled device low light level television camera member for conveying said component images therebetween.

8. The night vision display apparatus of claim 5 wherein said means for displaying said component images further comprises:

video mixer electrical circuit means for converting each of said component images into a color-related component of said composite common output image; and color coded signal responsive means for visually communicating said composite common output image as a color image to said user person.

9. The method of communicating a composite image, representative of an input scene which includes objects generating signatures of differing visible to near infrared spectral wavelengths, to a user person comprising the steps of:

dividing said input image into a plurality of component images each containing input scene partial portions received from a selected different signature spectrum wavelength range of said input image; and displaying each of said component images to said user person as an in-registration different color component of a visible spectrum wavelength resident, composite common output image.

10. The method of claim 9 wherein said input image comprises a near infrared spectral range limited night vision device-collected image.

11. The method of claim 9 wherein said input image components are two in number.

12. The method of claim 9 wherein said dividing step includes communicating said input image to a plurality of radiant energy signal to video electrical signal transducer members via a plurality of radiant energy bandpass filter elements.

13. The method of claim 9 wherein said displaying step includes combining said input image components in a video mixer electrical circuit.

14. The method of claim 13 wherein said combining step includes one of the concepts of signal addition and synchronization signal generation in accordance with National Television System Committee (NTSC) standards.

15. The method of displaying the output of a night vision device to a user person comprising the steps of;

dividing a near infrared spectrum input image received by said night vision device into a plurality of component images each inclusive of input image objects residing in a selected different near infrared spectrum band;

shifting a wavelength characteristic of each said selected different near infrared spectrum band into a different color portion of the visible spectrum wavelength band to form color components of an output image of said night vision device; and combining said color components of an output image into a composite night vision device output image.

16. The method of claim 15 wherein said shifting step includes converting said near infrared spectrum input image received by said night vision device into an image within Commission Internationale de l'Eclairage (CIE) color space.

17. The method of claim 15 wherein said shifting step includes converting said near infrared spectrum input image received by said night vision device into input a plurality of optical wavelength-segregated electrical signals.

18. The method of claim 17 wherein said combining step includes mixing said electrical signals and mixing color components of said composite night vision device output image.

* * * * *